(12) United States Patent
Philipp et al.

(10) Patent No.: US 10,513,074 B2
(45) Date of Patent: Dec. 24, 2019

(54) TRANSFORMING STATION FOR BLOW MOULDING MACHINES WITHOUT PRESSURE PAD

(71) Applicant: KRONES AG, Neutraubling (DE)

(72) Inventors: Thomas Philipp, Eilsbrunn (DE); Thomas Spitzer, Wiesent (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 15/546,354

(22) PCT Filed: Jan. 2, 2017

(86) PCT No.: PCT/EP2017/050014
§ 371 (c)(1),
(2) Date: Jul. 26, 2017

(87) PCT Pub. No.: WO2017/167461
PCT Pub. Date: Oct. 5, 2017

(65) Prior Publication Data
US 2019/0009451 A1   Jan. 10, 2019

(30) Foreign Application Priority Data

Mar. 31, 2016  (DE) .......................... 10 2016 105 857

(51) Int. Cl.
*B29C 49/56* (2006.01)
*B29C 49/48* (2006.01)
*B29L 31/00* (2006.01)

(52) U.S. Cl.
CPC .............. *B29C 49/56* (2013.01); *B29C 49/48* (2013.01); *B29C 2049/4892* (2013.01); *B29C 2049/566* (2013.01); *B29L 2031/7158* (2013.01)

(58) Field of Classification Search
CPC .............. B29C 49/56; B29C 2049/566; B29C 2049/4892
See application file for complete search history.

(56) References Cited

U.S. PATENT DOCUMENTS 2,006,056 A    6/1935  McNamara
2,485,452 A *  10/1949  Lyijynen ................. B30B 11/14
                                                425/451.2
(Continued)

FOREIGN PATENT DOCUMENTS

DE   102012104754   12/2013
EP       1636005    3/2006
EP       2942179    11/2015

OTHER PUBLICATIONS

International Search Report dated Mar. 22, 2017 issued in International Application No. PCT/EP2017/050014.
(Continued)

*Primary Examiner* — Robert B Davis
(74) *Attorney, Agent, or Firm* — Onello & Mello, LLP (57) ABSTRACT

Transforming station for transforming plastic parisons into plastic containers, wherein the transforming station has two side part supports for supporting side parts of a blow mould, and preferably has a base part support for supporting a base part of the blow mould, wherein these side parts and the base part of the blow mould together form a hollow space within which the plastic parisons can be transformed into the plastic containers by application of a free-flowing medium, wherein at least one of the two side part supports for opening and/or closing the blow mould is pivotable relative to the other side part with respect to a predetermined main axis, and wherein the transforming station has a locking mechanism in order in a closed state of the blow mould to lock a side part support with the other side part support, and wherein the locking mechanism has a second locking element which is pivotable with respect to a predetermined pivot axis and which interengages with a first locking element for locking the side parts. According to the invention at least one of the two locking elements has a first contact surface which is suitable to co-operate with a second contact surface of the first locking element during locking with the first locking element, wherein at least one of these contact surfaces is (Continued)

designed in such a way that in a pivoting operation of the second locking element with respect to the pivot axis in the direction of the first locking element the two side part supports are pushed towards one another.

16 Claims, 4 Drawing Sheets

(56) References Cited

U.S. PATENT DOCUMENTS

| | | | |
|---|---|---|---|
| 3,652,751 A * | 3/1972 | Criss et al. | B29C 49/34 |
| | | | 264/542 |
| 3,825,396 A * | 7/1974 | Kontz | B29C 49/56 |
| | | | 425/541 |
| 8,721,315 B2 | 5/2014 | Maki et al. | |
| 9,050,749 B1 | 6/2015 | Yang et al. | |
| 2006/0275525 A1 | 12/2006 | Lemaistre et al. | |
| 2007/0026098 A1 | 2/2007 | Lemaistre et al. | |

OTHER PUBLICATIONS

German Search Report dated Jan. 13, 2017 issued in German Application No. 102016105857.2.
European Office Action dated Mar. 22, 2019 issued in corresponding European Application No. 17700013.0.
International Preliminary Report on Patentability dated Oct. 11, 2018 in International Application No. PCT/US2017/050014, with English translation.

* cited by examiner

TRANSFORMING STATION FOR BLOW MOULDING MACHINES WITHOUT PRESSURE PAD

The present invention relates to a transforming station for transforming plastic parisons into plastic containers. Such transforming stations, which can be parts of blow moulding machines, are used in order to produce plastic bottles. In this case heated plastic parisons are introduced in blow moulds input and are transformed there by means of blowing air to form plastic containers and in particular plastic bottles. For this purpose these transforming stations usually have blow mould supports, which support parts of blow moulds. The plastic parisons are introduced into the blow mould, the mould is closed and then the expansion of the plastic parison takes place.

In this case it is known from the prior art that in particular the points at which the side parts of the blow moulds contact one another are critical in the production of the plastic parisons and produce seams on the finished bottles. In the prior art various procedures are known for keeping these seams small. In particular the most varied locking mechanisms for the blow mould parts or the blow mould supports are known.

Thus locking techniques are known which have locking shaft systems, magnet systems or pin systems. Usually, however, only the mould support halves are closed and locked, so that as a result a flush and positively engaging locking of the mould shells or the blow mould parts is not achieved directly. Thus for example a system of this type is known from EP 1 636 005 B1, in which barbs which are secured against rotation (as a locking device) are displaced with respect to one another in the longitudinal direction in order thus to effect engagement.

In order in this case to further reduce the mould gap it is known from the prior art to use a pressure pad system, wherein with the blow mould already closed one blow mould part is pressed against the other by means of the pressure pad. However, the need for the pressure pad for flush and positively engaging closure of the blow mould gives rise to relatively high expenditure, for example, in order to supply this pressure pad with compressed air. A comparatively high expenditure is also necessary for tubing and with regard to the pressure pad sealing. In addition, there is also a need for relatively high process costs in order to control this pressure pad and also a relatively high expenditure relating to malfunctions as well as relatively high wear.

Therefore the object of the present invention is in particular to reduce the production costs and also the process costs. In particular the expenditure necessary for the provision of the said pressure pad should be reduced. This object is achieved according to the invention by the subject matter of the independent claims. Advantageous embodiments and modifications are the subject of the subordinate claims.

A transforming station according to the invention for transforming plastic parisons into plastic containers and in particular plastic bottles has two side part supports which are intended to support side parts of a blow mould. Furthermore, this transforming station preferably has a base part support for supporting a base part of the blow mould. These side parts as well as the base part of the blow mould together form a hollow space within which the plastic parisons can be transformed into the plastic containers by application of a free-flowing medium and in particular with compressed air. Furthermore, at least one of the two side part supports for opening and/or closing the blow mould is pivotable relative to the other side part with respect to a predetermined main axis. Furthermore, the transforming station has a locking mechanism in order in a closed state of the blow mould to lock a side part support with the other side part support (and/or to lock one blow mould part with the other one and/or to lock one blow mould shell with the other blow mould shell). Furthermore, the locking mechanism has a second locking element which is pivotable with respect to a predetermined pivot axis and which interlocks with a first locking element for locking the side parts.

According to the invention at least one of the two locking elements has a first contact surface which is suitable and intended to co-operate with a second contact surface of the first locking element during locking with the first locking element, wherein at least one of these contact surfaces is designed in such a way that in a pivoting operation of the second locking element with respect to the pivot axis in the direction of the first locking element the two side part supports are pushed towards one another.

It is therefore proposed that the locking mechanism or the locking element is designed so that initially a latched state between the side part supports is produced, wherein a certain mould gap is still possible here. A blow mould part, for example a blow mould half on the other blow mould part, in particular the other blow mould half, is preferably delivered by a further pivoting movement of the locking element. Thus the locking elements preferably effect not only locking of the side part supports but also, depending upon the pivot position, cause the two blow mould parts to be pushed towards one another. In this way a mould gap between the two blow mould side parts can be reduced. The pivot axis about which the locking element is pivoted is preferably a pivot axis which extends parallel to a longitudinal axis of the containers to be transformed.

Thus the invention describes a locking system of a transforming station or blow mould unit, which preferably has two interengaging closure elements or locking elements, wherein at least one locking element is rotatably supported. In this case at least one of these closure elements or locking elements preferably has in an engagement area of the second locking element a contact surface and in particular a radius or a similar geometry which previously ensured a closure of the side part supports and moreover, depending upon the configuration of this surface or the similar geometry, enables the mould support halves or side part supports to be moved towards one another and closed in a flush or positively engaged manner.

Preferably the respective other locking element likewise has a corresponding surface which is adapted to the first-mentioned surface of the first locking element. In this way a dual function is fulfilled, namely the side part supports are latched and additionally a flush and/or positively engaging closure of the mould shells and/or the blow mould part is effected. Due to this flush closure of the mould shells there may be no need for a pressure pad, which in the prior art was used for flush closure of these mould shells or blow mould parts was used in order to ensure the required quality of the dividing seam. This quality is ensured here by the flush and/or positively engaging approach of the respective other side part support. In this way it is possible to omit the entire pressure pad unit and also there is no expenditure with respect to a leakage of the pressure pad.

An improved self-locking preferably occurs through the surface, for example the radius or the similar geometry, on at least one of the two locking elements. Self-locking is understood in mechanics to be the friction-induced resistance against slipping or twisting of two abutting bodies. As soon as the static friction is exceeded, the bodies are no longer self-locking. The self-locking is influenced by values such as the angle of inclination, the surface roughness the bearing surfaces, the material combination, the sliding rate, but also by the lubricant and the heating.

In order to achieve self-locking, the resulting angle is less than the arc tangent of the static friction coefficient. Thus if in the present example the angle between the surfaces is 2.86°, in order to achieve the self-locking a coefficient of sliding friction of 0.05 would result or, conversely, with a coefficient of sliding friction of 0.05 the angle chosen would have to be 2.86° (or less). A coefficient of sliding friction of 0.05 is realistic if steel contacts (lubricated) steel, wherein this constitutes the most unfavourable state with regard to the friction. Thus the angle between the surfaces is preferably chosen in such a way that the aforementioned self-locking occurs.

Preferably there are no surfaces which are planar relative to one another, but a surface which is slightly curved, in particular through the radius, is provided. This additionally increases the reliability, since the curved surface functions as a "barb".

In this way the wear can also be reduced. In addition there is also no control-related expenditure in order to activate a pressure pad and in particular, for example, pneumatic valves can be omitted.

In a preferred embodiment, in a pivoting operation of the second locking element in the direction of the first locking element and with respect to the pivot axis initially the two side part supports are latched with respect to one another and then are pushed towards one another. This can take place in such a way that preferably initially in a pivoting operation of the second locking element about a first angle one locking element engages with the other one, and in the event of further pivoting in the same direction or in the same pivoting direction the two side parts are pushed towards one another. Thus, preferably, initially an engagement takes place which latches the transforming station in a closed state, and only then one of the side part supports is advanced towards the other side part support.

In a further advantageous embodiment the transforming station is designed without pressure pads. This means that the attachment of a pressure pad, for example between the side part support and a mould shell or also between a mould shell and the side part of the blow mould, can be omitted. Instead, the movement which is otherwise enabled by the pressure pad takes place due to the described advancing operation which is carried out during the locking. Therefore the locking movement of the side part supports preferably also effects an advance of the two side parts of the blow mould towards one another.

In a further advantageous embodiment the contact surface of a locking element has a curved and/or oblique portion which co-operates with the contact surface of the other locking element in order to advance the two side part supports towards one another. This curved and/or oblique portion may be a curved portion with a specific radius and/or also an oblique portion.

Preferably at least one locking element has a hook-like configuration. Preferably both locking elements have a hook-like configuration. Preferably at least one locking element extends along the direction the main axis. Preferably both locking elements extend along the direction the main axis. Preferably at least one locking element is formed continuously along the main axis configuration. However, it would also be possible that a plurality of locking elements are arranged along the direction of the main axis one behind the other and preferably are also spaced apart from one another.

Furthermore the system preferably also has a damping and/or spring device, which damps the closing movement during closure of the blow mould. In this case this damping device is preferably arranged on at least one of the two side part supports. The system preferably has two such damping and/or spring elements. Particularly preferably at least one locking element is arranged in the direction of the main axis between these two damping and/or spring elements. In this case these damping elements can have an elastic material and/or a spring element. These damping and/or spring elements preferably counteract a closing movement of the side part supports.

In a further advantageous embodiment the first locking element and the second locking element are formed in such a way that in a predetermined pivot position of the second locking element with respect to the first locking element the contact surfaces of the two locking elements are opposite one another, but a gap is formed between the two contact surfaces.

This constitutes a position in which the blow mould is substantially closed, or can no longer be opened, since this is then prevented by the contact surfaces of the two locking elements. In this case the gap is preferably formed in a circumferential direction of the pivoting movement of the two blow mould support parts and/or a circumferential direction of the pivoting movement of the at least one locking element. The contact surfaces preferably overlap in a circumferential direction of the pivoting movement in this position in such a way that during opening these contact surfaces abut one another.

The contact surfaces and/or the locking elements preferably overlap in such a way that opening of the blow mould is prevented by this overlap, in particular since during opening the contact surfaces abut one another.

This is explained further with reference to the drawings. In this case the configuration may be such that in this first pivot position the two locking elements are opposite one another, but still have a predefined spacing or gap with respect to one another.

In this case this gap can extend in a radial direction of the pivoting movement of the at least one blow mould support part. The said gap therefore allows a certain play of the support before the blow mould support parts are closed overall.

In a further advantageous embodiment this said gap can be reduced by a further pivoting movement of the second locking element. This further pivoting movement is in particular a further pivoting movement in the direction of a completely locked state and/or a pivoting movement which follows the above-mentioned pivoting movement which leads to the overlap between the locking elements. Thus due to this reduction of the mould gap one contact surface of one locking element is advanced towards the corresponding second contact surface of the first locking element and finally contacts this second contact surface. With a further movement the both blow mould support parts can be advanced further towards one another.

Thus the gap is closed by a further pivoting movement of the second locking element. The above-mentioned gap likewise preferably extends in the direction of the main axis.

In a further advantageous embodiment the side parts and/or the mould shells which support the side parts have contact surfaces which contact one another flatly. Due to this configuration the mould shells and/or the side parts can be placed flush against one another with a flat contact surface, so that the mould gap between the side parts can be kept small.

In a further advantageous embodiment at least one of these contact surfaces has a projection extending in the direction of the main axis. This may for example be a curved or lug-like projection.

In a further advantageous embodiment the other one of these contact surfaces has a recess which extends in the direction of the main axis and is particularly preferably adapted to the said projection. In this case the projection can lie in the recess in a closed state of the blow mould. In this way the two blow mould side parts and/or the mould shells are centred very exactly.

In a further advantageous embodiment at least one of the contact surfaces of the locking elements is a hardened contact surface. Advantageously both contact surfaces are hardened contact surfaces. In this way rapid wear of these contact surfaces, which must absorb comparatively high forces, can be avoided.

Furthermore the present invention is directed to a system for transforming plastic parisons into plastic containers, wherein this system has a movable and in particular rotatable support on which a plurality of the transforming stations described above are arranged. Advantageously the transforming stations each have rod-like bodies which can be introduced into the plastic parisons in order to expand these containers in the longitudinal direction.

In a further advantageous embodiment the transforming stations each have application devices in order to apply a free-flowing and in particular gaseous medium to the plastic parisons. These application devices can for example be blow moulding dies which can be placed on a rim of the mouth of the plastic parisons.

In a further advantageous embodiment the transforming station described above also has a base part support which can be latched to the described side part support for closure of the blow mould.

Furthermore, the present invention is directed to a method for closing a transforming station for transforming plastic parisons into plastic containers. In this case, the transforming station has two side part supports for supporting side parts of a blow mould, and preferably also has a base part support for supporting a base part of the blow mould. In this case these side parts and the base part of the blow mould together form a hollow space within which the plastic parisons are transformed into the plastic containers by application of a free-flowing and in particular gaseous medium.

In this case at least one of the two side part supports for closing the blow mould is pivoted with respect to a predetermined main axis and, furthermore, the transforming station has a locking mechanism in order in a closed state of the blow mould to lock one side part support with the other side part support. Furthermore, the locking mechanism has a second locking element which is pivoted with respect to a predetermined pivot axis and which interlocks with a first locking element for locking the side parts.

According to the invention at least one of the two locking elements has a first contact surface which is suitable to co-operate with a second contact surface of the first locking element during locking with the first locking element, wherein at least one of these contact surfaces is designed in such a way that in a pivoting operation of the second locking element with respect to the pivot axis in the direction of the first locking element the two side part supports are pushed towards one another.

Therefore in terms of the method it is also proposed that initially a locking or latching of the blow mould support parts takes place by means of the locking elements, wherein a certain gap or a certain play in the pivoting movement is enabled here. This gap is closed and preferably the blow mould parts are also pushed towards one another by a further advance movement of the locking element. Here too the actual expansion operation of the plastic parisons preferably also takes place without the use of a pressure pad. A transforming station of the type described above is preferably used for the method.

Further advantages and embodiments are disclosed by the appended drawings.

Figure 1:
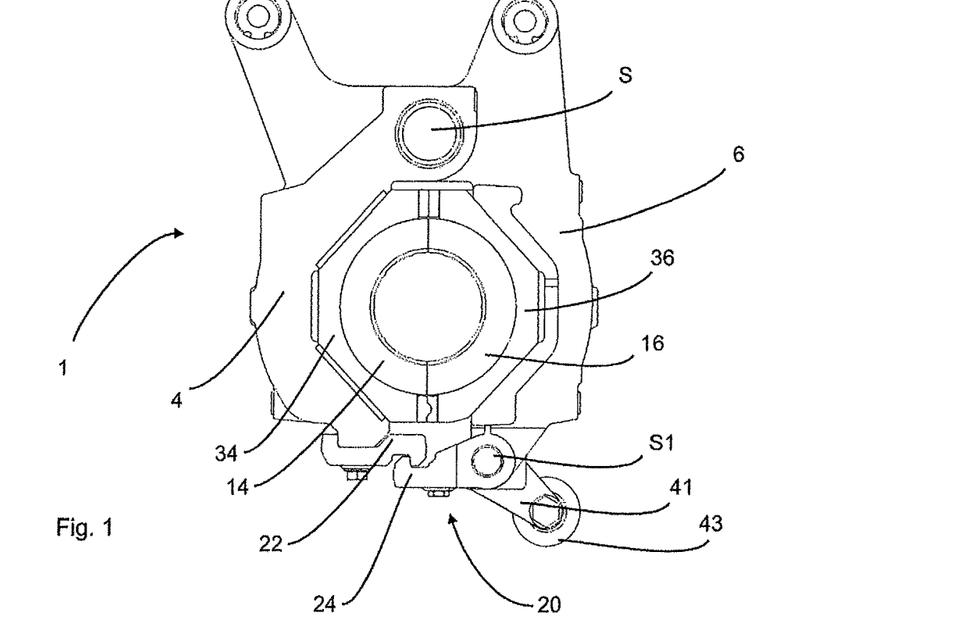
FIG. 1 shows a schematic representation of a transforming station.

FIG. 1 shows a representation of a transforming station 1 according to the invention. This transforming station 1 has two side part supports 4 and 6. These are pivotable with respect to one another and with respect to a main axis S. In this case it is possible that both side part supports are pivoted with respect to this main axis. It would also be possible that only one of the two side part supports is pivoted with respect to the main axis. It would also be conceivable that two axes parallel to one another are provided, with respect to which the two side part supports are pivoted. Here the main axis S or a corresponding pivot shaft extends perpendicularly to the drawing plane. Mould shells 34 and 36 are each arranged on the two blow mould support parts. Blow mould side parts 14 and 16 are in turn arranged on these mould shells 34 and 36.

The reference numeral 20 identifies as a whole a locking mechanism which for serves for locking the two side part supports 4 and 6 in particular during a blow moulding process. For this purpose a first locking element 22 is provided which is fastened to the first side part support 4. A second locking element 24 is arranged pivotably on the second side part support. In this case in particular pivoting of this second locking element 24 with respect to a pivot axis S1 is possible. The reference numeral 41 denotes a lever arm by means of which the pivoting of the locking element 24 with respect to the pivot axis S1 can be achieved. The pivot axis S1 in turn is parallel to the main pivot axis S. For pivoting of the locking element a cam roller 43 with an in particular stationary guide cam (not shown) is provided. In addition, however, other drives would also be conceivable, such as in particular electrical drives, which serve for pivoting the side part supports.

Figure 2:
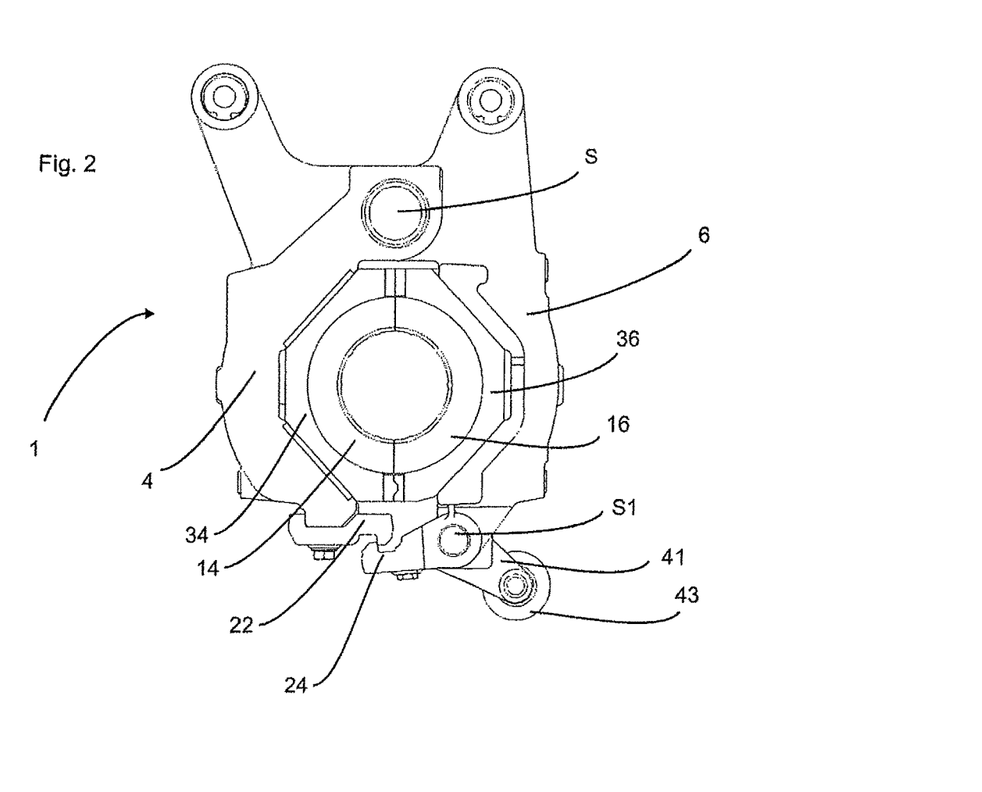
FIG. 2 shows a representation of a transforming station in a state in which it is not yet completely closed, but in which latching of the side part supports is provided.

FIG. 2 shows the transforming station 1 in a state in which the side part supports or the blow mould parts 14 and 16 are almost closed, but not yet completely locked. In this case it will be recognised that the two locking elements 22 and 24 already interengage, but are not yet completely closed with one another. However, opening of the blow mould is no longer possible here.

Figure 3:
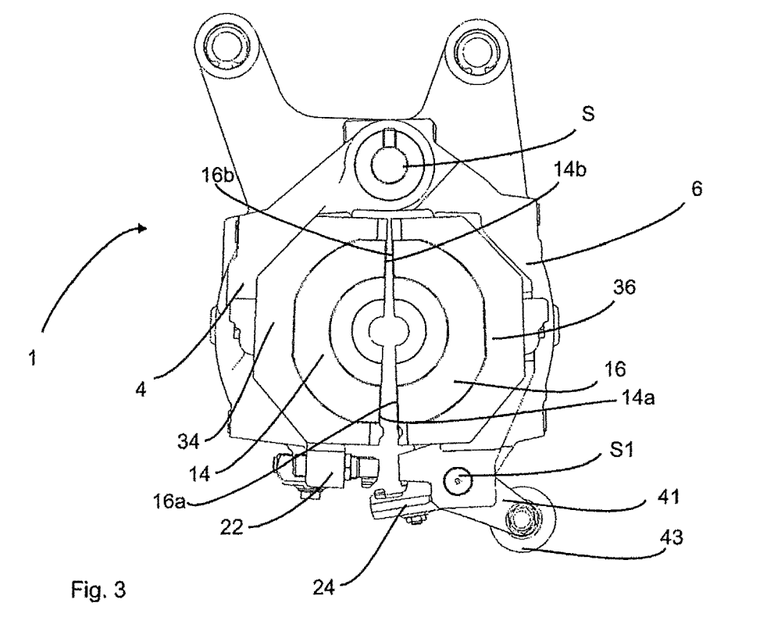
FIG. 3 shows a representation of a transforming station in a state in which it is not yet completely locked.

FIG. 3 shows a representation of the transforming station 1 in a state in which it is not yet closed. Here the two locking elements 22 and 24 do not yet interengage and the blow mould side parts 14 and 16 are still open with a clear gap. The reference numerals 14a and 14b relate to contact surfaces of the first blow mould part and the reference numerals 16a and 16b relate to contact surfaces of the second blow mould part. In a closed state of the blow mould the contact surfaces 14a and 16a as well as 14b and 16b abut one another. The resulting mould gap is also determined by the accuracy of this abutment. Therefore the configuration of the locking elements causes these two contact surfaces to be pressed particularly precisely against one another.

Figure 4:
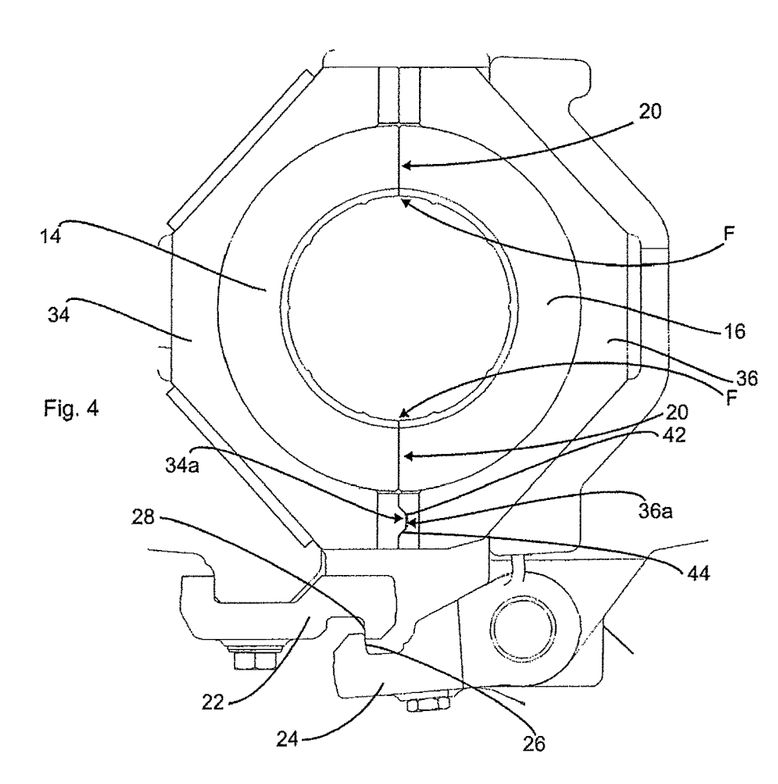
FIG. 4 shows a detail of the locking mechanism in a latched, but not yet completely locked state.

FIG. 4 in turn shows an enlarged representation similar to FIG. 2. Although the two locking elements 22 and 24 already interengage, they are not yet in a completely closed state. Furthermore, it will be recognised that the mould support shells 34 and 36 in each case form contact surfaces 42 and 44 with one another. In this case the contact surface 42 has a projection 34a. The contact surface 44 has a recess 36a. These can interengage. Thus this projection 34a and the recess 36a form a relatively large common contact surface with one another.

Furthermore, the first locking element has a contact surface 28 and the second locking element 24 has a second contact surface 26. Likewise as set out in greater detail below, these interact so that initially a latching of the side part supports and later then also a movement of the two side part supports towards one another is achieved and thus also the mould gap is minimised.

Figure 5:
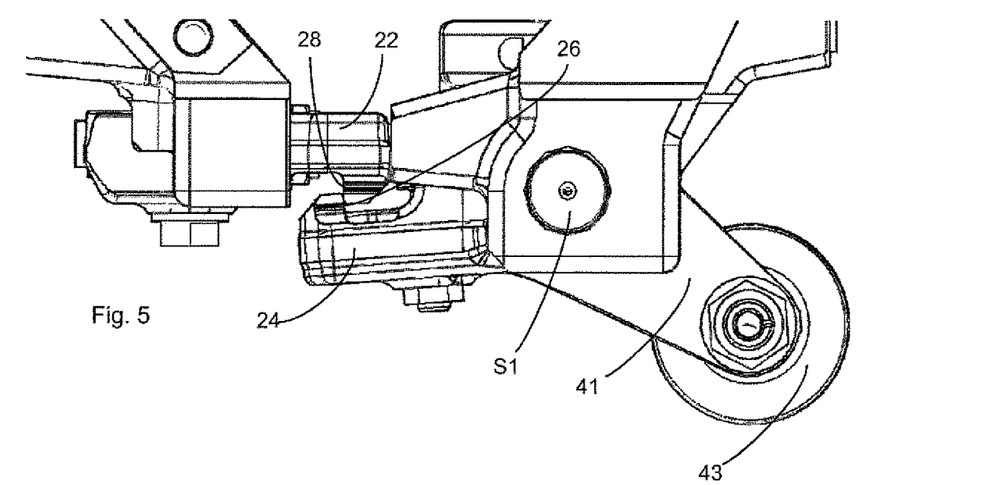
FIG. 5 shows a further detail of a transforming station in the latched, but not yet completely locked state.

FIG. 5 shows a further representation in an almost closed state. This also shows the contact surfaces 26 and 28, which produce locking of the blow mould as well as also moving the side part supports towards one another.

Figure 6:
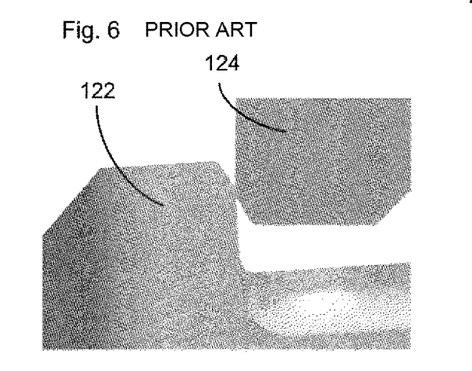
FIG. 6 shows a representation of two locking elements according to the prior art.

FIG. 6 shows a detail of locking elements 122 and 124 according to the prior art. It will be seen that these already contact one another in the illustrated position. In this way there is no longer any gap which enables a certain play between the blow mould parts. Also, if the pivoting is continued, no more movement of the blow mould parts towards one another is achieved.

Figure 7:
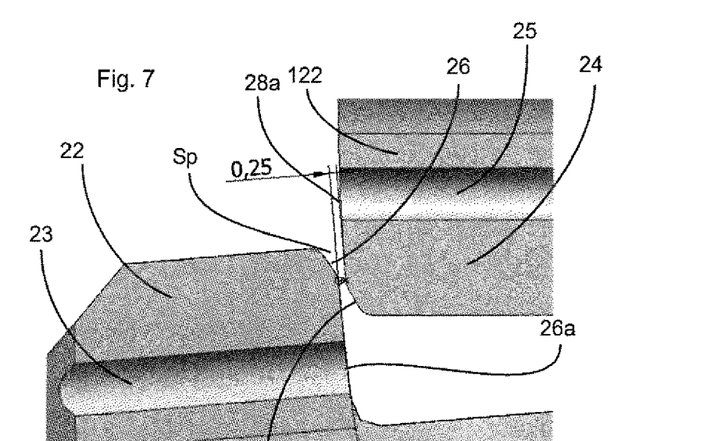
FIG. 7 shows a representation of two locking elements according to the invention.

FIG. 7 shows a representation of two locking elements according to the invention. It will be seen here that the contact surfaces 26 and 28 in each case have substantially straight portions 26a and 28a. In the state shown in FIG. 4 illustrated state a gap Sp is formed between the two contact surfaces 26 and 28. This gap can have a width for example between 0.1 mm and 0.5 mm, preferably between 0.15 mm and 0.35 mm and particularly preferably between 0.2 mm and 0.3 mm. Whilst this gap is formed, there is still a certain play of the two locking elements with respect to one another and thus also with regard to the two side part supports on which these locking elements are arranged. With a further movement this gap is completely closed and the two locking elements are also pushed towards one another. In this way the mould gap between the blow mould parts is also closed.

The reference numerals 23 and 25 relate respectively to recesses which are arranged in the two locking elements.

Figure 7A:
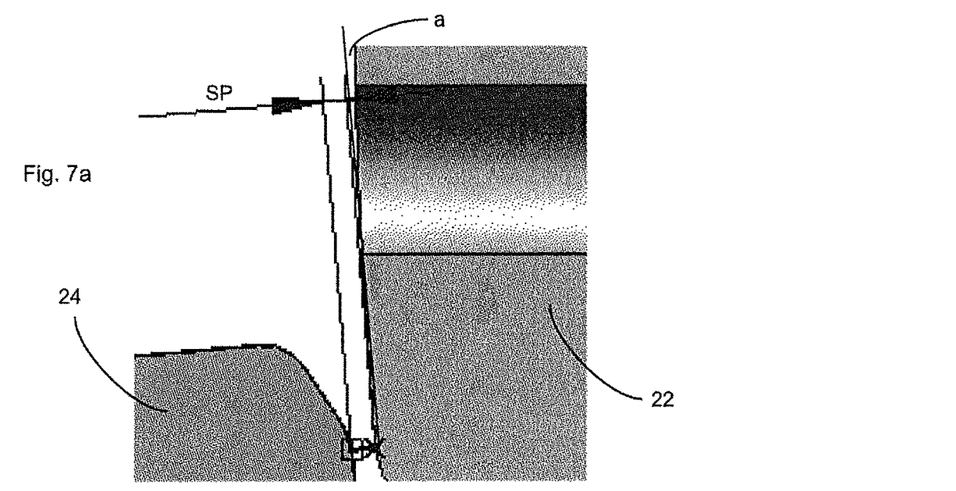
FIG. 7a shows an enlarged view of the representation shown in FIG. 7.

FIG. 7a shows an enlargement of the representation from FIG. 7. It will be recognised here that the contact surface 28a is slightly inclined with respect to the gap Sp or the boundary line of the gap SP shown in the drawing. The contact surface preferably has an angle a with respect to this gap or the (geometric) boundary line thereof, this angle being between 1° and 20°, preferably between 1° and 15°, preferably between 1° and 10° and particularly preferably between 1° and 8°. In a completely pivoted-in state of the locking element, the contact surface 28 preferably lies flat on the contact surface 26.

Figure 8:
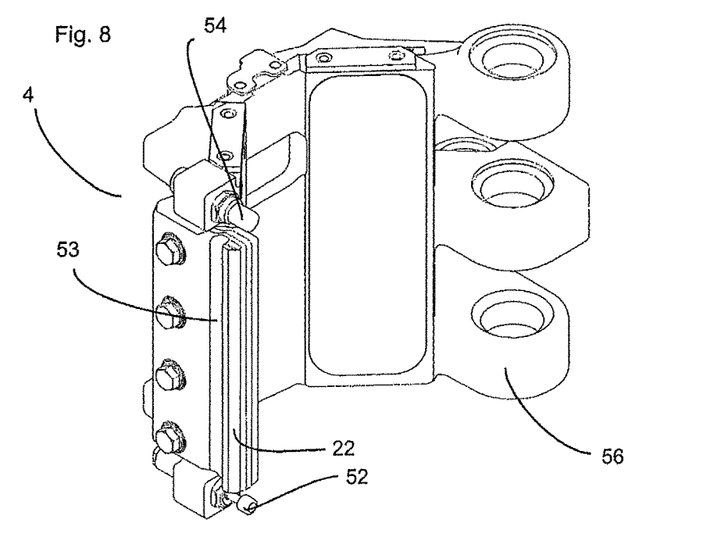
FIG. 8 shows a representation of a side part support of a blow mould.

FIG. 8 shows a further representation of a side part support 4. It will be seen that here in addition to the locking element 2 and the groove 53 formed thereby, in which the second locking element (not shown) engages, damping or prestressing elements 52 and 54 are also provided. In combination with the second side part supports (not shown), these prestressing elements 52, 54 likewise effect targeted closure of the blow mould. In this case these prestressing elements can generate a force which pushes the two side part supports apart, but which is overcome by the force generated by the locking elements. The reference numeral 56 denotes holders on which a pivot shaft for pivoting the blow mould support part can be received.

Figure 9:
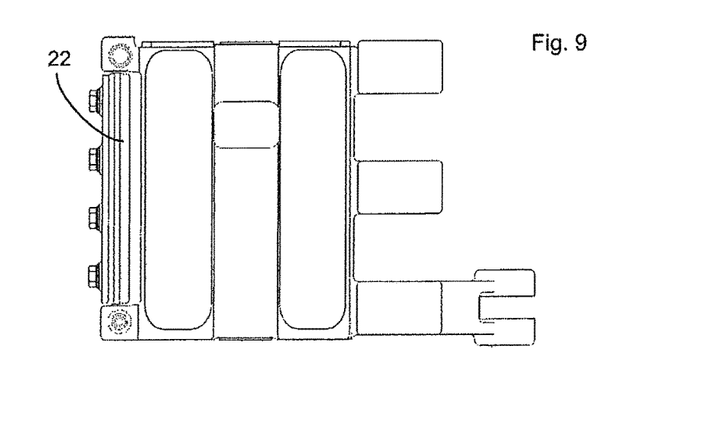
FIG. 9 shows a side view of the side part support shown in FIG. 8.

FIG. 9 shows a side view of the side part supports shown in FIG. 8. Here too once again the locking element 22 is illustrated.

The applicant reserves the right to claim all the features disclosed in the application documents as essential to the invention in so far as they are individually or in combination novel over the prior art. Furthermore it is pointed out that in the individual drawings features were also described which may be advantageous per se. The person skilled in the art recognises immediately that a specific feature described in a drawing may also be advantageous without the incorporation of further features from this drawing. Furthermore the person skilled in the art recognises that advantages may also result from a combination of several features shown in individual drawings or in different drawings.

The invention claimed is:

1. Transforming station for transforming plastic parisons into plastic containers, wherein the transforming station has two side part supports for supporting side parts of a blow mould, and a base part support for supporting a base part of the blow mould, wherein these side parts and the base part of the blow mould together form a hollow space within which the plastic parisons can be transformed into the plastic containers by application of a free-flowing medium, wherein at least one of the two side part supports for opening and/or closing the blow mould is pivotable relative to the other side part with respect to a predetermined main axis, and wherein the transforming station has a locking mechanism in order in a closed state of the blow mould to lock a side part support with the other side part support, and wherein the locking mechanism has a second locking element which is pivotable with respect to a predetermined pivot axis and which interengages with a first locking element for locking the side parts, characterised in that at least one of the two locking elements has a first contact surface which is suitable to co-operate with a second contact surface of the first locking element during locking with the first locking element, wherein at least one of these contact surfaces is designed in such a way that in a pivoting operation of the second locking element with respect to the pivot axis in the direction of the first locking element the two side part supports are pushed towards one another, wherein in a predetermined pivot position of the second locking element with respect to the first locking element, the contact surfaces of the first and second locking elements are opposite one another, a gap having a width between 0.1-0.5 mm is present between the first and second contact surfaces, and the blow mould is substantially closed or can no longer be opened.

2. Transforming station according to claim 1, wherein in a pivoting operation of the second locking element in the direction of the first locking element initially the two side part supports are latched with respect to one another and then are pushed towards one another.

3. Transforming station according to claim 1, wherein the transforming station is designed without pressure pads.

4. Transforming station according to claim 1, wherein the contact surface of a locking element has a curved and/or oblique portion which co-operates with the contact surface of the other locking element in order to advance the two side part supports towards one another.

5. Transforming station according to claim 1, wherein the gap can be reduced by a further pivoting movement of the second locking element with respect to the other locking element.

6. Transforming station according to claim 1, wherein the side parts and/or the mould shells supporting the side parts have contact surfaces which contact one another flatly.

7. Transforming station according to claim 6, wherein at least one of these contact surfaces has a projection extending in the direction of the main axis.

8. Transforming station according to claim 7, wherein at least the other one of these contact surfaces has a recess which extends in the direction of the main axis and in this way is geometrically adapted to the projection.

9. Transforming station according to claim 1, wherein at least one of the contact surfaces of the locking elements is a hardened contact surface.

10. Method for closing a transforming station for transforming plastic parisons into plastic containers, wherein the transforming station has two side part supports for supporting side parts of a blow mould, and a base part support for supporting a base part of the blow mould, wherein these side parts and the base part of the blow mould together form a hollow space within which the plastic parisons are transformed into the plastic containers by application of a free-flowing medium, wherein at least one of the two side part supports for closing the blow mould is pivoted relative to the other side part with respect to a predetermined main axis, and wherein the transforming station has a locking mechanism in order in a closed state of the blow mould to lock a side part support with the other side part support, and wherein the locking mechanism has a second locking element which is pivoted with respect to a predetermined pivot axis and which interengages with a first locking element for locking the side parts, characterised in that at least one of the two locking elements has a first contact surface which is suitable to co-operate with a second contact surface of the first locking element during locking with the first locking element, wherein at least one of these contact surfaces is designed in such a way that in a pivoting operation of the second locking element with respect to the pivot axis in the direction of the first locking element the two side part supports are pushed towards one another, wherein in a predetermined pivot position of the second locking element with respect to the first locking element, the contact surfaces of the first and second locking elements are opposite one another, a gap having a width between 0.1-0.5 mm is present between the first and second contact surfaces, and the blow mould is substantially closed or can no longer be opened.

11. Transforming station according to claim 1, wherein one of the first and second contact surfaces of the first and second locking elements, respectively, for engagement purposes has a radius or a similar geometry so that there are no surfaces of the first and second locking elements which are planar relative to one another, but instead a surface is provided which is slightly curved through the radius or similar geometry.

12. Transforming station according to claim 1, wherein at least one of a damping or spring device is arranged on at least one of the two side part supports.

13. Transforming station according to claim 12, wherein the at least one of the damping or spring device includes two damping and/or spring elements.

14. Transforming station according to claim 13, wherein at least one locking element is arranged in the direction of the main axis between the two damping and/or spring elements.

15. Transforming station according to claim 12, wherein the damping and/or spring elements counteract a closing movement of the side part supports.

16. Transforming station according to claim 1, wherein the gap has a width between 0.15 mm and 0.35 mm.

* * * * *